US007920360B2

(12) United States Patent
Obregon et al.

(10) Patent No.: US 7,920,360 B2
(45) Date of Patent: Apr. 5, 2011

(54) TORSION COMPENSATION COIL FOR VOICE COIL MOTOR OF DISK DRIVE DEVICE, AND METHOD OF MAKING THE SAME

(75) Inventors: Francisco Obregon, Ripon, CA (US);
Mark S. Seymour, Felton, CA (US);
John E. Scura, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 957 days.

(21) Appl. No.: 11/802,329

(22) Filed: May 22, 2007

(65) Prior Publication Data

US 2008/0291563 A1 Nov. 27, 2008

(51) Int. Cl.
*G11B 21/02* (2006.01)
(52) U.S. Cl. ......................................................... 360/265
(58) Field of Classification Search .................... 360/265
See application file for complete search history.

(56) References Cited

U.S. PATENT DOCUMENTS

| | | | | |
|---|---|---|---|---|
| 5,448,437 A * | 9/1995 | Katahara | ....................... | 360/265 |
| 5,768,061 A * | 6/1998 | Casey et al. | ................... | 360/265 |
| 6,134,889 A * | 10/2000 | Markyvech et al. | ............ | 60/602 |
| 6,225,712 B1 * | 5/2001 | Miyamoto et al. | ............. | 310/15 |
| 6,501,726 B1 * | 12/2002 | Liu | ................ | 720/683 |
| 6,529,351 B1 | 3/2003 | Oveyssi et al. | | |
| 6,906,897 B1 * | 6/2005 | Oveyssi | ....................... | 360/265 |
| 6,922,301 B1 * | 7/2005 | Wittig et al. | .................... | 360/75 |
| 7,038,886 B1 * | 5/2006 | Chang et al. | .............. | 360/264.7 |

* cited by examiner

*Primary Examiner* — Jefferson Evans
(74) *Attorney, Agent, or Firm* — Nixon & Vanderhye P.C.

(57) ABSTRACT

Certain example embodiments relate to torsion compensation coils that cooperate with primary coils in voice coil motors of disk drive devices, and methods of making the same. In certain example embodiments, a voice coil motor is provided which may include a single external magnet. A primary coil may be located above the external magnet, with the primary coil being capable of receiving a first current. At least one torsion compensation coil may be connected to the primary coil. The at least one torsion compensation coil may be capable of receiving a second current. The at least one torsion compensation coil may be configured to reduce torsion and/or bending forces introduced by the first current passing through primary coil and/or magnetic field leakage from the external magnet.

21 Claims, 8 Drawing Sheets

TORSION COMPENSATION COIL FOR VOICE COIL MOTOR OF DISK DRIVE DEVICE, AND METHOD OF MAKING THE SAME

FIELD OF THE INVENTION

The example embodiments described herein relate to information recording disk drive devices and, more particularly, to torsion compensation coils that cooperate with primary coils in voice coil motors of disk drive devices, and methods of making the same.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

Figure 1:
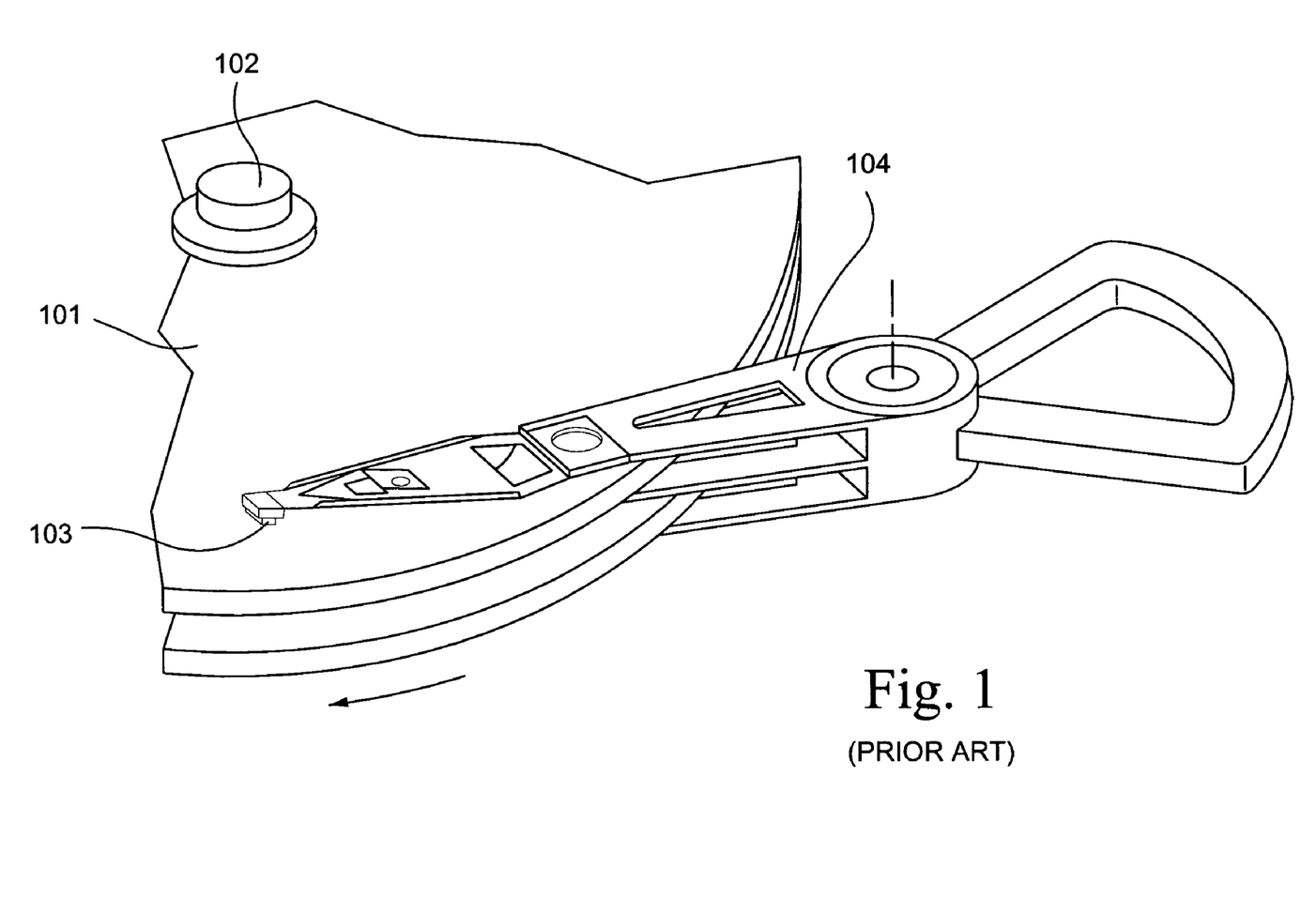
FIG. 1 is a partial perspective view of a conventional disk drive unit.

FIG. 1 illustrates a conventional disk drive unit and shows a magnetic disk 101 mounted on a spindle motor 102 for spinning the disk 101. A voice coil motor arm 104 carries a head gimbal assembly (HGA) that includes a slider 103 incorporating a read/write head (sometimes having an associated micro-actuator). A voice-coil motor (VCM) is provided for controlling the motion of the motor arm 104 and, in turn, controlling the slider 103 to move from track to track across the surface of the disk 101, thereby enabling the read/write head to read data from or write data to the disk 101. Hard disk drives also typically include an upper and lower magnet located proximate to the end of the VCM (e.g., at the actuator fan tail portion). This design generally offers good TMR (Track MisRegistration) performance, higher servo bandwidth, and reduction of torsion and/or bending forces related to asymmetric magnetic forces.

Unfortunately, however, the upper and lower magnet configuration suffers from several drawbacks, as well. For example, one drawback of this design approach relates both to the cost of an additional magnet, as well as the cost of the discarded magnetic material that is wasted during the manufacturing process. This problem sometimes becomes even more of an issue when the disk drive form factor is reduced, because a reduction in the form factor also increases the amount of wasted magnetic material compared to the actual material that is used in the product. Therefore, a design inefficiency is introduced.

One hard disk drive has been built in large quantities that implements a single magnet design. However, this disk drive design was unique to the disk drive industry because it included a single head, with a single arm that was mounted to an unsupported rotating shaft. This design approach suffers from many drawbacks. For example, this approach generally is unable to achieve higher servo bandwidth, suffers poor TMR, lacks a good rotary vibration performance, etc. These drawbacks, taken individually and/or in combination, unfortunately produce lower storage capacities and poor overall performance for the resulting disk drive device. Other attempts to develop single magnet designs have been unsuccessful, because they have required increased power consumption and have provided lower seek performance.

Thus, it will be appreciated that there is a need in the art for improved voice coil motors, and methods of making the same.

SUMMARY OF THE INVENTION

One aspect of certain example embodiments relates to a single magnet VCM design.

Another aspect of certain example embodiments relates to at least one torsion compensation coil located on or proximate to the end of the VCM, with the torsion compensation coil being optionally counter-wound, in parallel or in series.

Still another aspect of certain example embodiments relates to reduced torsion and/or bending forces introduced into the actuator fan tail related to, for example, asymmetric magnetic forces (e.g., caused in two-magnet VCM arrangements) and/or a reduced amount of magnetic field leakage (e.g., for single magnet designs).

According to certain example embodiments, a voice coil motor is provided and may include a single external magnet. A primary coil may be located above the external magnet, with the primary coil being capable of receiving a first current. At least one torsion compensation coil may be connected to the primary coil. The at least one torsion compensation coil may be capable of receiving a second current. The at least one torsion compensation coil may be configured to reduce torsion and/or bending forces introduced by the first current passing through primary coil and/or magnetic field leakage from the external magnet.

According to certain other example embodiments, a disk drive device is provided. A head gimbal assembly may carry a slider having a read/write head formed thereon. A drive arm may be connected to the head gimbal assembly. A disk also may be included. A spindle motor may be operable to spin the disk. A voice coil motor may be connected to the drive arm. The voice coil motor may comprise a single external magnet. A primary coil may be located above the external magnet, with the primary coil being capable of receiving a first current. At least one torsion compensation coil may be connected to the primary coil. The at least one torsion compensation coil may be capable of receiving a second current. The at least one torsion compensation coil may be configured to reduce torsion and/or bending forces introduced by the first current passing through primary coil and/or magnetic field leakage from the external magnet.

In certain non-limiting example embodiments, the primary coil may comprise a rear leg and an opposing front leg connected by two side legs, the rear leg and the front leg each including facing inner surface. The at least one torsion compensation coil may be connected to the primary coil at the inner surface of the rear leg of the primary coil. Alternatively, in certain other non-limiting example embodiments, the rear leg of the torsion compensation coil may be connected to the rear leg of the primary coil and the side legs of the torsion compensation coil may be connected to the side legs of the primary coil at respective inner surfaces of the primary coil. In still other non-limiting example embodiments, two torsion compensation coils may be provided, with each torsion compensation coil being substantially circularly shaped and being connected to the primary coil where the rear leg connects to the respective side legs.

According to still other example embodiments, a method of making a voice coil motor capable of reducing torsion and/or bending forces introduced into an actuator fan tail portion of the voice coil motor is provided. A primary coil and at least one torsion compensation coil may be provided. The primary coil may be wound. The at least one torsion compensation coil may be wound during the primary coil winding step. The at least one torsion compensation coil may be connected to the primary coil. A magnet may be positioned under the connected at least one torsion compensation and primary coils.

In certain non-limiting example embodiments, a circuit for providing a first current to the at least one torsion compensation coil and a second current to the primary coil may be provided, with the circuit being either a parallel circuit or a series circuit. The first and second currents may be provided so as to flow through their respective coils in opposite directions.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Certain example embodiments may provide at least one torsion compensation coil located on or proximate to the end of the VCM (e.g., at the actuator fan tail). Such a torsion compensation coil may be used to reduce (and, in certain example embodiments, eliminate) torsion and/or bending forces introduced into the actuator fan tail because of asymmetric magnetic forces when a single magnet frame design is used. The torsion compensation coil also may be used to cancel some or all of the magnetic field leakage (e.g., in single magnet designs).

In particular, a torsion compensation coil may be wound during the primary coil winding process. The torsion compensation coil then could be folded over and/or bonded to the primary coil at any location deemed appropriate to compensate for and/or reduce the targeted torsion and/or bending modes. The current flow through the torsion compensation coil optionally may be opposite that of the primary coil, while maintaining a series or parallel circuit with the primary coil (e.g., if the primary coil and the secondary coil(s) are wound together they may be said to be in series, whereas if they are wound separately it may be possible to connect them in parallel). In general, how the primary coil and secondary coil are wound together may determine the direction of opposing flux generation. In certain example embodiments, a single current source may be used to power both coils simultaneous, whereas a second current source may be provided to power in certain other example embodiments. The magnet flux field may be 90degrees from the left and right primary coil legs to counteract the out-of-plane forces. FIGS. 2-7 show various illustrative arrangements where torsion compensation coils are located on or proximate to the end of a VCM, in accordance with certain example embodiments.

Figure 2:
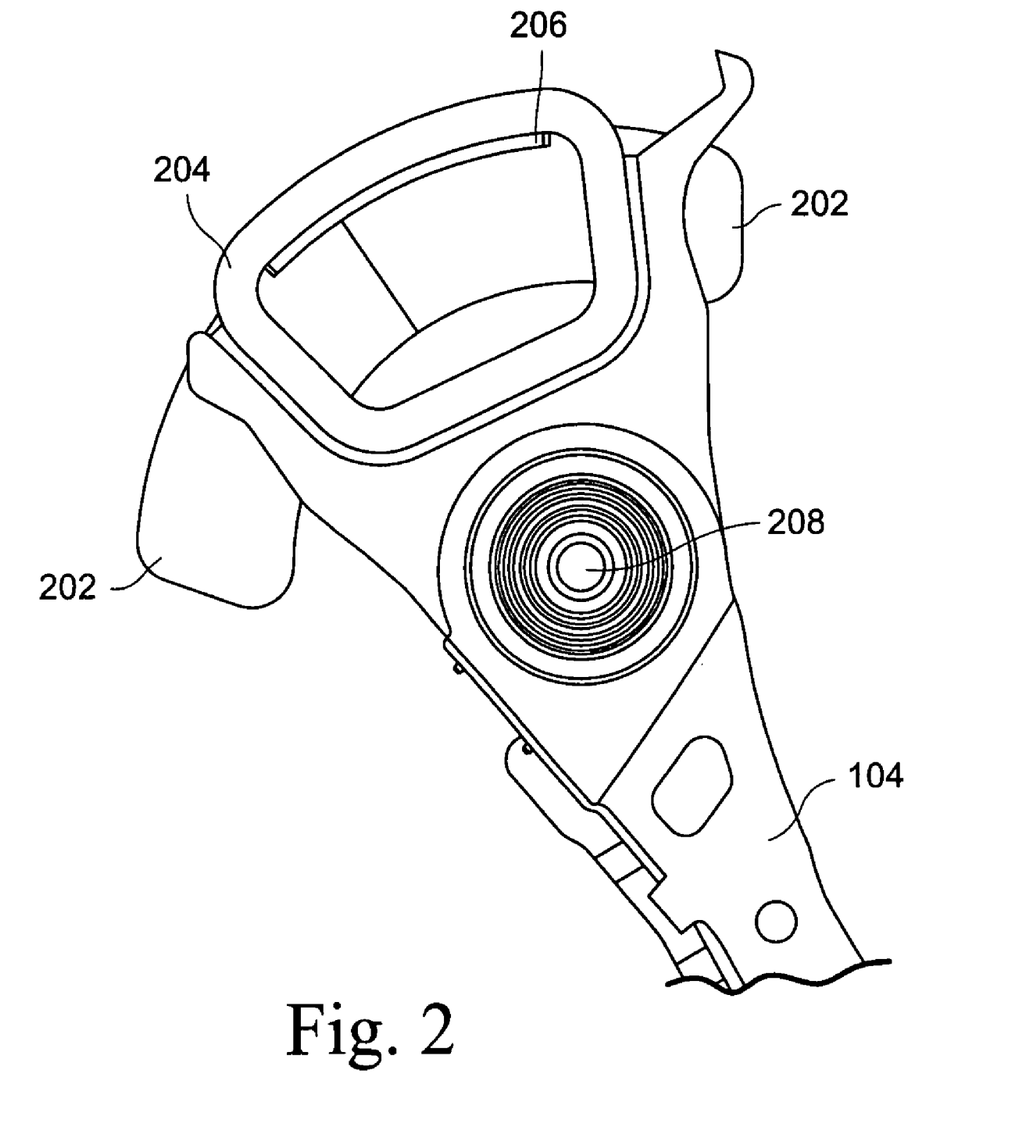
FIG. 2 shows a first torsion compensation coil design, in accordance with an example embodiment.

Referring now more particularly to the drawings, FIG. 2 shows a first torsion compensation coil design, in accordance with an example embodiment. In FIG. 2, a single magnet 202 is disposed underneath the end of the VCM arm. A primary coil 204 is provided, and compensation coil 206 is coupled thereto. The magnet and the coils cooperate to cause VCM rotation about the bearing 208.

Figure 3:
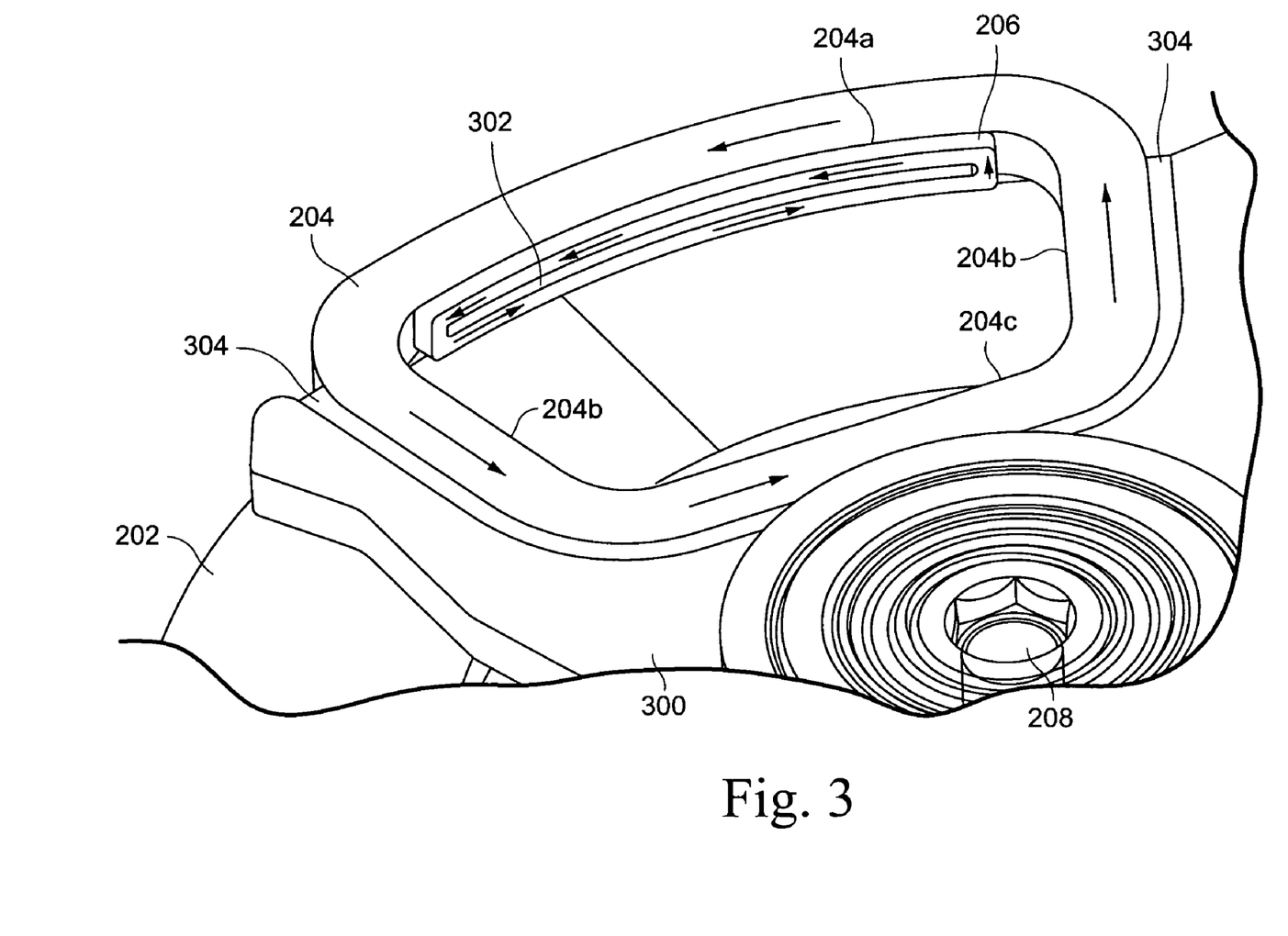
FIG. 3 is an enlarged partial perspective view of the end portion of FIG. 2, in accordance with an example embodiment.

FIG. 3 is an enlarged partial perspective view of the end portion of FIG. 2, in accordance with an example embodiment. Air gaps 304 may also be formed between the VCM arm 300 and the primary coil. As can be seen from FIG. 3, the compensation coil 206 is substantially ovular in shape, and has an air gap 302 formed between the upper and lower arcs of the oval shape. These and/or other air gaps may be filled using, for example, a structural epoxy adhesive, over-molding, etc. As shown in FIG. 3, the compensation coil 302 spans only a portion of the rear 204a of the primary coil 206 and, as such, does not touch the side portions 204b of the primary coil 204. The arrows around the primary coil and the compensation coil indicate the respective current flow directions. Also, the compensation coil 206 is connected to the inner portion of the primary coil 204, although the present invention is not so limited. Indeed, several alternative arrangements are, for example, described in greater detail below.

Accordingly, as shown in FIGS. 2 and 3, the voice coil motor comprises a primary coil comprising a rear leg and an opposing front leg connected by two side legs, the rear leg and the front leg each including facing inner surfaces. The torsion compensation coil is connected to the primary coil at the inner surface of the rear leg of the primary coil.

Figure 4:
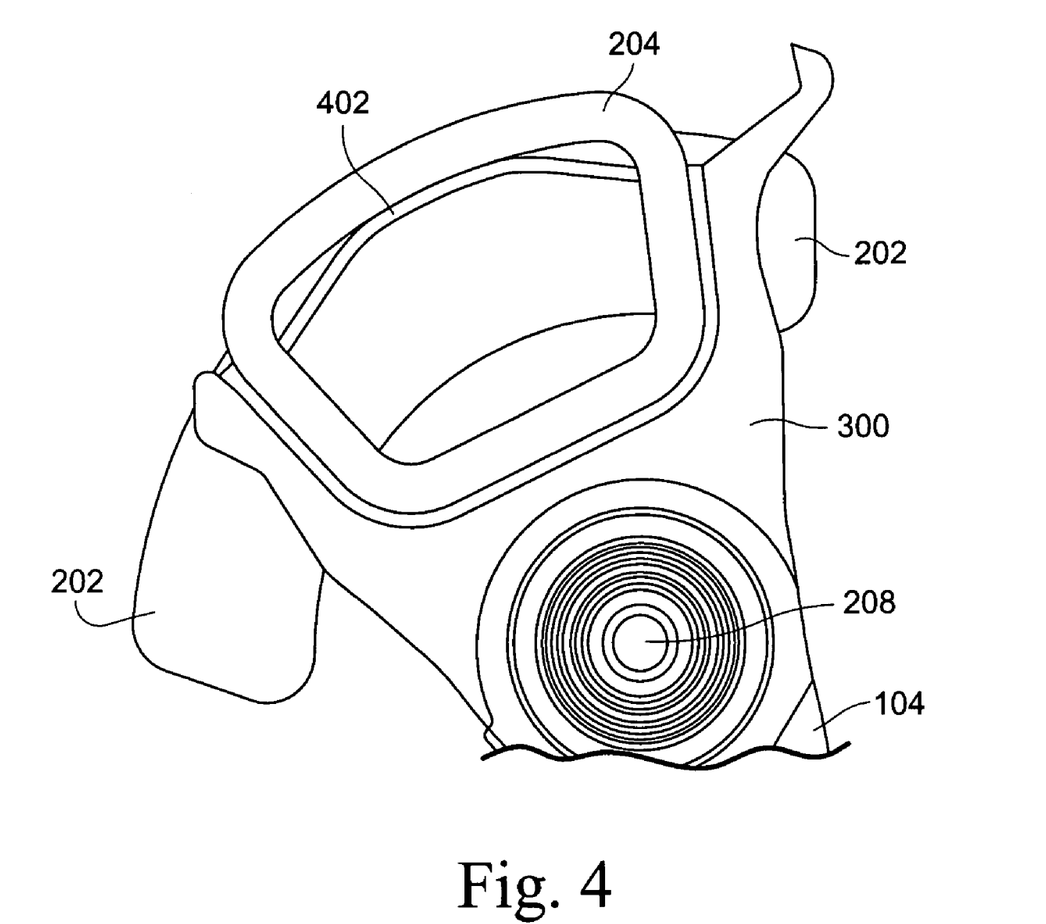
FIG. 4 shows a second torsion compensation coil design, in accordance with an example embodiment.
Figure 5:
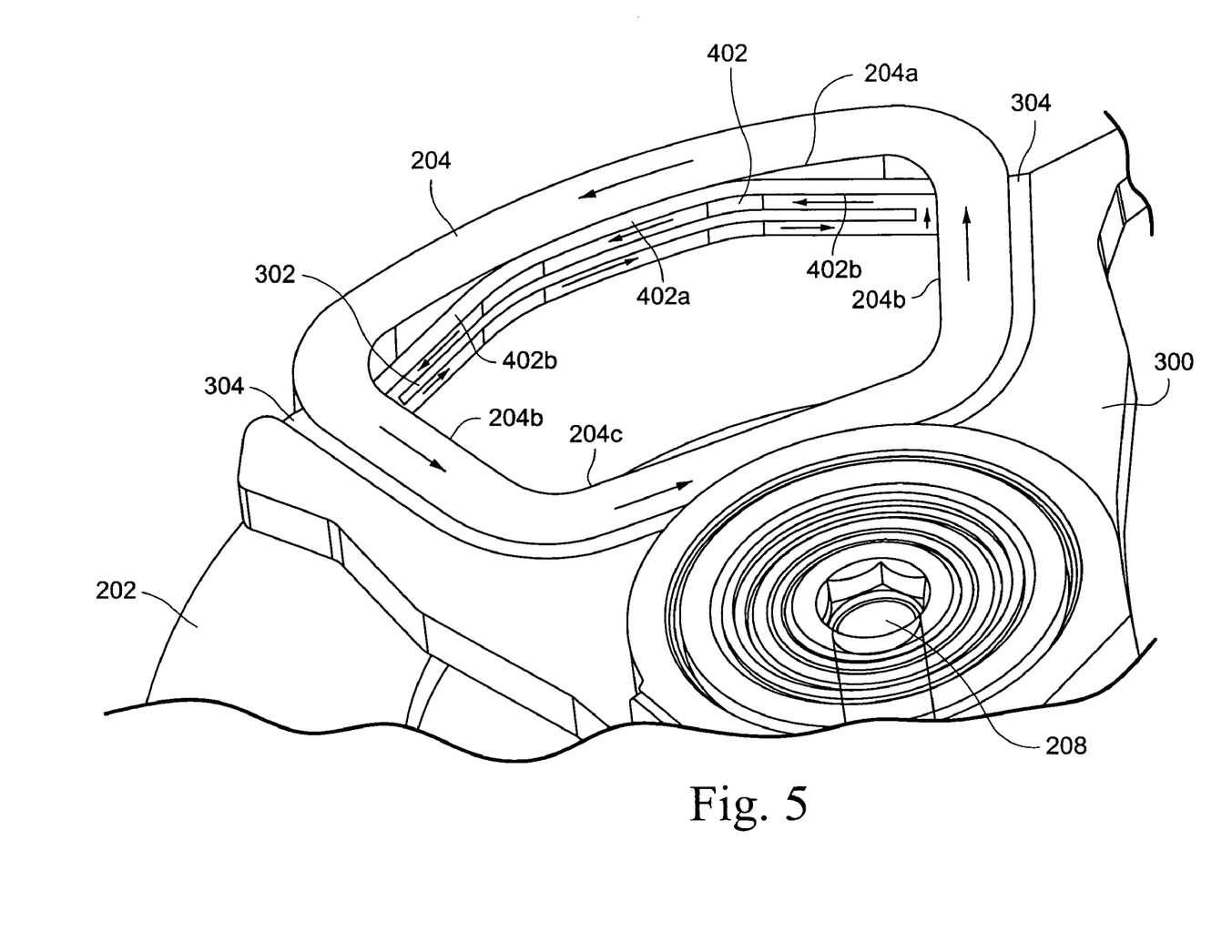
FIG. 5 is an enlarged partial perspective view of the end portion of FIG. 4, in accordance with an example embodiment.

FIG. 4 shows a second torsion compensation coil design, in accordance with an example embodiment, and FIG. 5 is an enlarged partial perspective view of the end portion of FIG. 4, in accordance with an example embodiment. As shown in FIGS. 4 and 5, the compensation coil 402 is somewhat C-shaped when viewed from above. Thus, the rear portion 402a of the abuts the rear portion 204a of the primary coil 204, and the side portions 402b of the compensation coil 402 extend from either side of the rear portion 402a of the compensation coil 402 inwards, connecting with the side portions 204b of the primary coil 204. As above, there is an air gap 302 formed between the upper and lower portions of the compensation coil 402, and the arrows again indicate the respective current flow directions.

As such, the voice coil motor of FIGS. 4 and 5 comprise a primary coil including a rear leg and an opposing front leg connected by two side legs, with the rear leg and the front leg each including facing inner surfaces. The torsion compensation coil comprises a rear leg and two side legs extending therefrom. The rear leg of the torsion compensation coil is connected to the rear leg of the primary coil and the side legs of the torsion compensation coil are connected to the side legs of the primary coil at respective inner surfaces of the primary coil.

Figure 6:
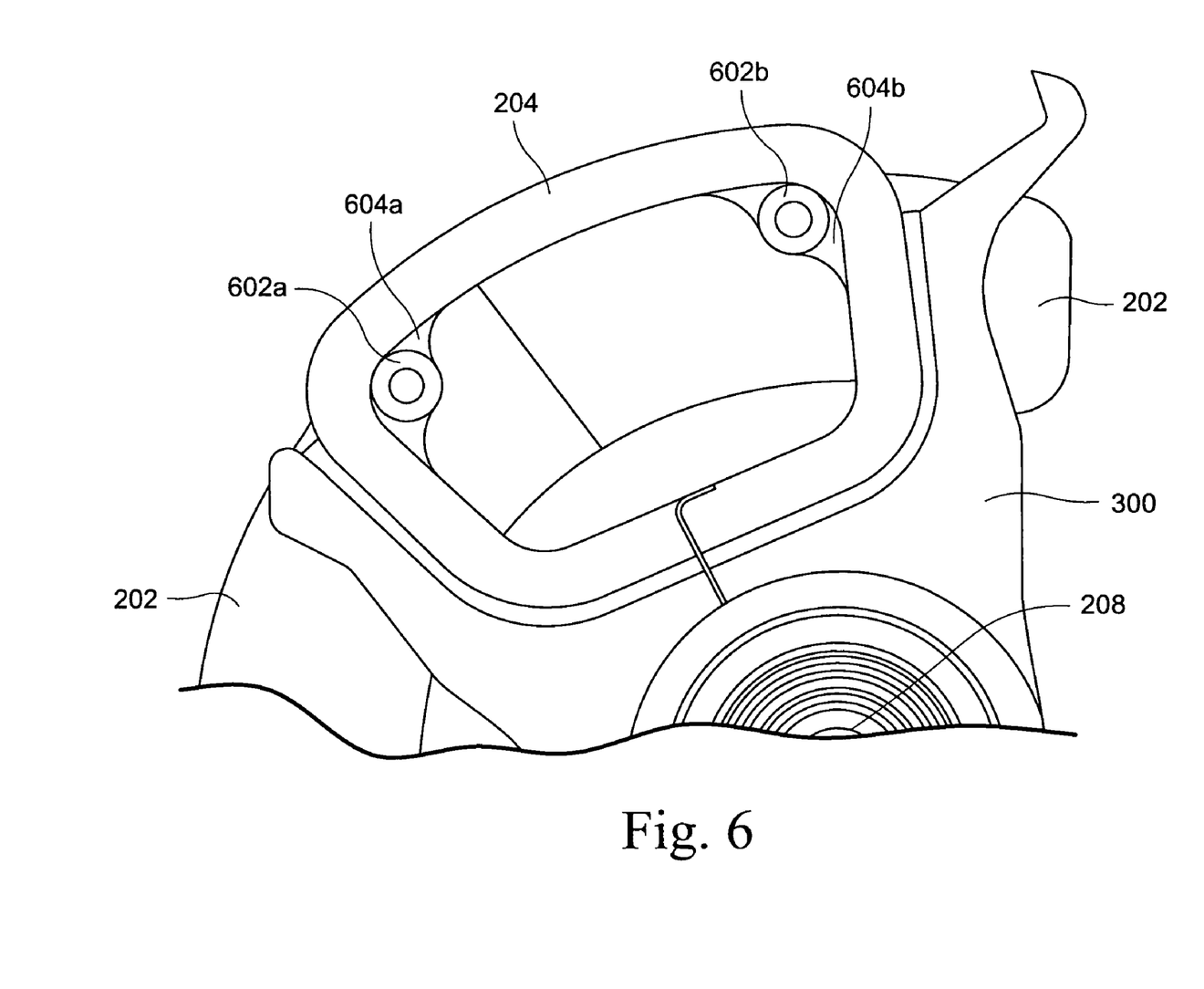
FIG. 6 shows a third torsion compensation coil design, in accordance with an example embodiment.
Figure 7:
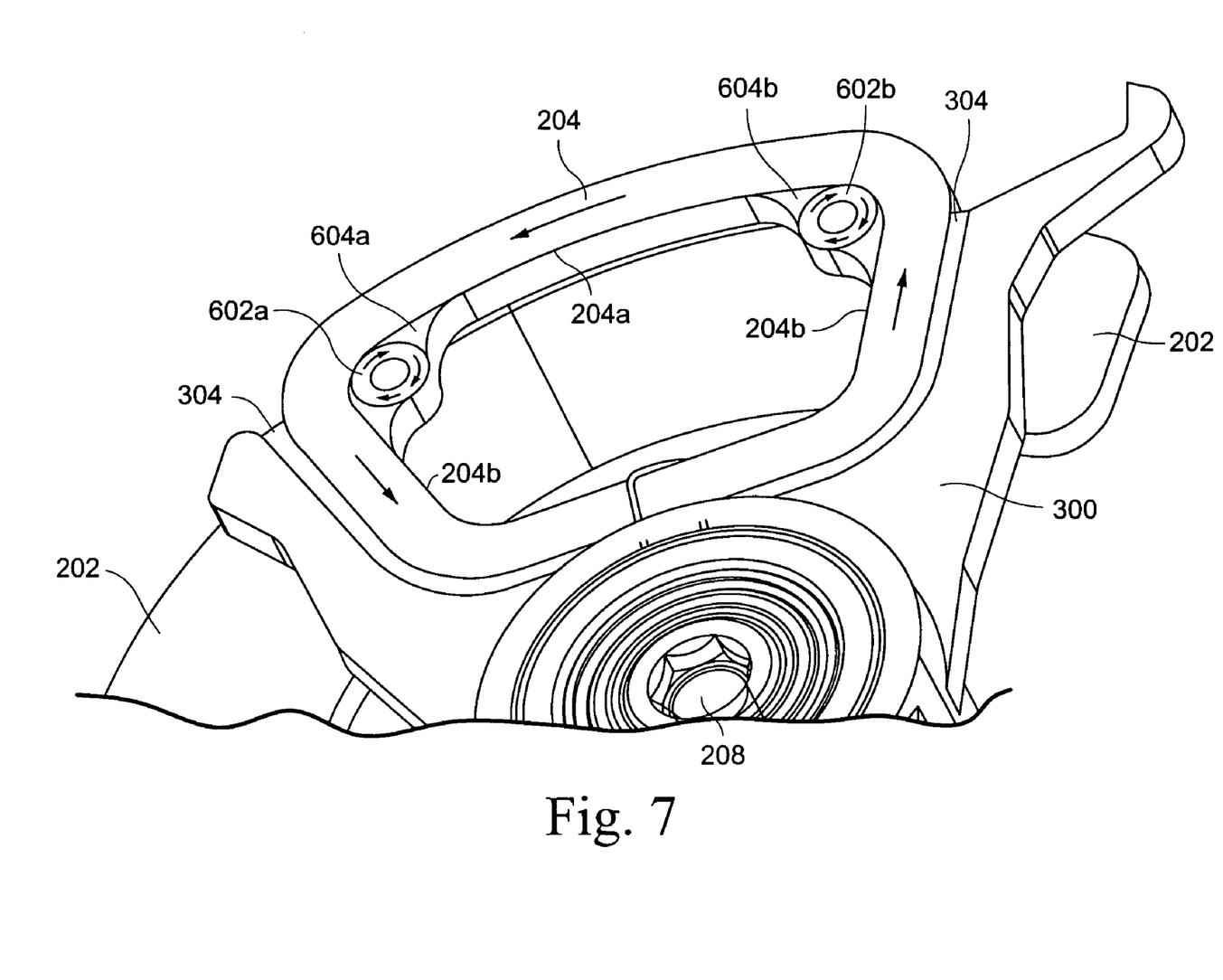
FIG. 7 is an enlarged partial perspective view of the end portion of FIG. 6, in accordance with an example embodiment.

FIG. 6 shows a third torsion compensation coil design, in accordance with an example embodiment, and FIG. 7 is an enlarged partial perspective view of the end portion of FIG. 6, in accordance with an example embodiment. As can be seen in FIGS. 6 and 7, two compensation coils 602a-b are provided. In particular, in the embodiments shown in FIGS. 6 and 7, the two compensation coils 602a-b are located in the rear corners of the primary coil 204, where the rear portion 204a of the primary coil 204 meets the side portions 204b. Optionally, connecting portions 604a-b may be provided for compensation coils 602a-b, respectively, to facilitate the connection between each compensation coil and the primary coil. Connection portions 604a-b may include, for example, a structural epoxy adhesive, any other suitable material for filling in any gaps.

As such, as the voice coil motors shown in FIGS. 6 and 7 may comprise two substantially circularly shaped torsion compensation coils. The primary coil comprises a rear leg and an opposing front leg connected by two side legs, with the rear leg and the front leg each including facing inner surfaces. Each torsion compensation coil is connected to the primary coil where the rear leg connects to the respective side legs.

The torsion compensation coils of certain example embodiments may effectively counter torsion and/or bending forces applied to the actuator fan tail. The torsion compensation coils of certain example embodiments also may enhance the performance of single magnet disk drive designs by, for example, improving the on-track dynamic performances for single-magnet designs, improving rotary vibration for single-magnet designs, etc. Still further, the arrangements of certain example embodiments may reduce costs compared to conventional two-magnet VCM designs. For example, cost reductions may be related to a reduction in the needed parts and/or to a reduction in the material wasted during manufacture (e.g., by reducing the need for an upper magnet). In certain example embodiments, such advantages may be obtained without having to sacrifice drive power consumption and/or drive performance.

It will be appreciated that the improved voice coil motors of certain example embodiments may be disposed with disk drive devices. It also will be appreciated that the designs of the voice coil motors, primary coils, and torsion compensation coils, shown in FIGS. 2-7 and described in connection therewith are given by way of example and without limitation.

Moreover, the torsion compensation coil(s) of certain example embodiments need not always have a reverse current with respect to the primary coil. For example, how the primary coil and the secondary coil(s) are wound may help to determine the direction of the opposing flux generation. A single current source capable of powering both coils simultaneously may be provided in certain example embodiments, whereas in certain other example embodiments a second current source optionally may be used instead. Indeed, any suitable arrangement for creating a reverse field generated proximate to the magnet and opposite from that of the primary coil may be implemented in certain example embodiments.

Figure 8:
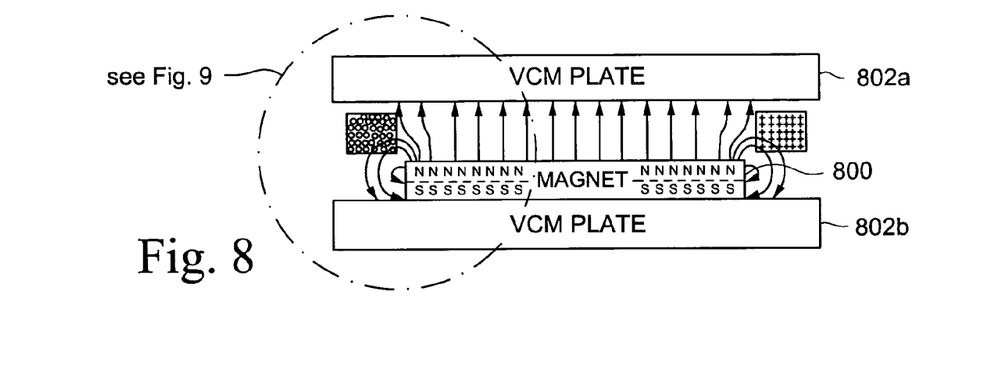
FIG. 8 illustrates the forces generated by a typical single magnet system that does not include a compensation coil.
Figure 9:
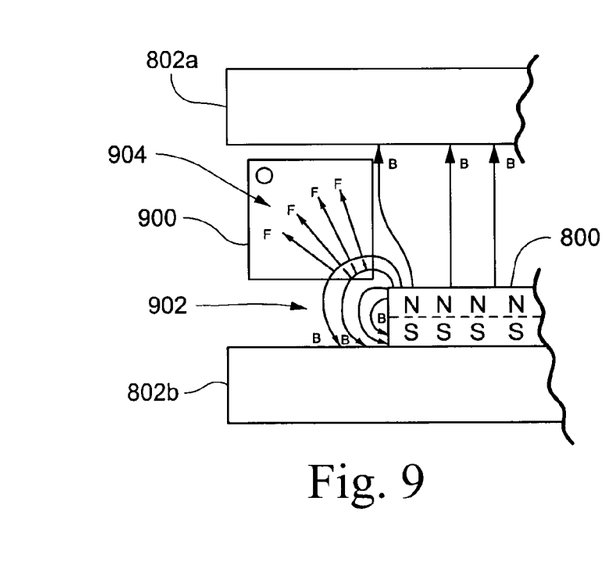
FIG. 9 is an enlarged view of the end portion of FIG. 8.

FIG. 8 illustrates the forces generated by a typical single magnet system that does not include a compensation coil, and FIG. 9 is an enlarged view of the end portion of FIG. 8. In a conventional double magnet design, the magnetic flux is generally straight from the bottom magnet to the top magnet. However, in the case of a single magnet design (e.g., as shown in FIGS. 8-9), there is a magnetic flux leakage around the edge of the magnet. This magnetic flux leakage may induce in the actuator fan tail of the primary coil an undesired force, causing torsion and bending of the actuator fan tail. More particularly, a single magnet 800 is sandwiched between an upper and lower VCM plates (e.g., steel VCM plates) 802a-b. Although some of the flux escapes in a generally straight fashion, there is magnetic flux leakage 902 as well as undesired forces 904 proximate to the actuator fan tail 900.

Figure 10:
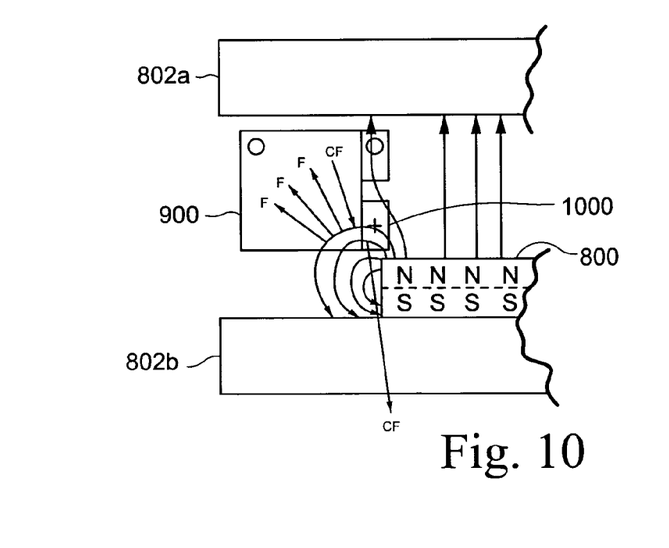
FIG. 10 illustrates the forces generated using a single magnet design having at least one compensation coil in accordance with an example embodiment.

To reduce such undesired forces, one or more torsion compensation coils may be disposed, as shown, for example, in FIGS. 3, 5, and 7. FIG. 10 illustrates the forces generated using a single magnet design having at least one compensation coil in accordance with an example embodiment. As shown in FIG. 10, using one or more torsion compensation coils may produce a compensation force CF opposed to the undesired forces. This compensation force may be generated around a lower compensation coil 1000, for example, reducing the undesired forces.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A voice coil motor, comprising:
a single external magnet;
a primary coil located above the external magnet, the primary coil being capable of receiving a first current; and,
at least one torsion compensation coil connected to the primary coil, the at least one torsion compensation coil being capable of receiving a second current;
wherein the at least one torsion compensation coil is configured to reduce torsion and/or bending forces introduced by the first current passing through primary coil and/or magnetic field leakage from the external magnet;
wherein the at least one torsion compensation coil is looped so as to form a gap between upper and lower portions of the torsion compensation coil;
wherein the primary coil comprises a rear leg and an opposing front leg connected by two side legs, the rear leg and the front leg each including facing inner surfaces; and,
wherein the at least one torsion compensation coil is connected to the primary coil at the inner surface of the rear leg of the primary coil.

2. The voice coil motor of claim 1, wherein the first current and the second current are applied so as to flow in opposite directions.

3. The voice coil motor of claim 1, wherein the primary coil and the at least one torsion compensation coil are counter-wound.

4. The voice coil motor of claim 1, wherein
the at least one torsion compensation coil comprises a rear leg and two side legs extending therefrom; and,
wherein the rear leg of the at least one torsion compensation coil is connected to the rear leg of the primary coil and the side legs of the at least one torsion compensation coil are connected to the side legs of the primary coil at respective inner surfaces of the primary coil.

5. The voice coil motor of claim 1, further comprising two torsion compensation coils.

6. The voice coil motor of claim 1, further comprising a single current source to provide the first current and the second current.

7. A voice coil motor, comprising:
a single external magnet;
a primary coil located above the external magnet. the primary coil being capable of receiving a first current; and,
first and second torsion compensation coil connected to the primary coil. the first and second compensation coils being capable of receiving a second current;
wherein the first and second torsion compensation coils are configured to reduce torsion and/or bending forces introduced by the first current passing through primary coil and/or magnetic field leakage from the external magnet;
wherein each said torsion compensation coil is substantially circularly shaped,
wherein the primary coil comprises a rear leg and an opposing front leg connected by two side legs, the rear leg and the front leg each including facing inner surfaces; and,
wherein each said torsion compensation coil is connected to the primary coil where the rear leg connects to the respective side legs.

8. A disk drive device, comprising:
a head gimbal assembly carrying a slider having a read/write head formed thereon;
a drive arm connected to the head gimbal assembly;
a disk;
a spindle motor operable to spin the disk; and,
a voice coil motor connected to the drive arm, the voice coil motor comprising:
a single external magnet;
a primary coil located above the external magnet, the primary coil being capable of receiving a first current; and,
at least one torsion compensation coil connected to the primary coil, the at least one torsion compensation coil being capable of receiving a second current;
wherein the at least one torsion compensation coil is configured to reduce torsion and/or bending forces introduced by the first current passing through primary coil and/or magnetic field leakage from the external magnet;
wherein the at least one torsion compensation coil is looped so as to form a gap between upper and lower portions of the torsion compensation coil;
wherein the primary coil comprises a rear leg and an opposing front leg connected by two side legs. the rear leg and the front leg each including facing inner surfaces; and,
wherein the at least one torsion compensation coil is connected to the primary coil at the inner surface of the rear leg of the primary coil.

9. The disk drive device of claim 8, wherein the first current and the second current are applied so as to flow in opposite directions.

10. The disk drive device of claim 8, wherein the primary coil and the at least one torsion compensation coil are counter-wound.

11. The disk drive device of claim 8, further comprising two torsion compensation coils.

12. The disk drive device of claim 8, further comprising a single current source to provide the first current and the second current.

13. A disk drive device, comprising:
a head gimbal assembly carrying a slider having a read/write head formed thereon;
a drive arm connected to the head gimbal assembly;
a disk;
a spindle motor operable to spin the disk; and,
a voice coil motor connected to the drive arm, the voice coil motor comprising:
a single external magnet;
a primary coil located above the external magnet, the primary coil being capable of receiving a first current; and,
at least one torsion compensation coil connected to the primary coil, the at least one torsion compensation coil being capable of receiving a second current;
wherein the at least one torsion compensation coil is configured to reduce torsion and/or bending forces introduced by the first current passing through primary coil and/or magnetic field leakage from the external magnet;
wherein the at least one torsion compensation coil is looped so as to form a gap between upper and lower portions of the torsion compensation coil;
wherein the primary coil comprises a rear leg and an opposing front leg connected by two side legs, the rear leg and the front leg each including facing inner surfaces;
wherein the at least one torsion compensation coil comprises a rear leg and two side legs extending therefrom; and,
wherein the rear leg of the at least one torsion compensation coil is connected to the rear leg of the primary coil and the side legs of the at least one torsion compensation coil are connected to the side legs of the primary coil at the respective inner surfaces of the primary coil.

14. A disk drive device, comprising:
a head gimbal assembly carrying a slider having a read/write head formed thereon;
a drive arm connected to the head gimbal assembly;
a disk;
a spindle motor operable to spin the disk; and,
a voice coil motor connected to the drive arm, the voice coil motor comprising:
a single external magnet;
a primary coil located above the external magnet, the primary coil being capable of receiving a first current; and,
first and second torsion compensation coils connected to the primary coil, the first and second torsion compensation coils being capable of receiving a second current;
wherein the first and second torsion compensation coils are configured to reduce torsion and/or bending forces introduced by the first current passing through primary coil and/or magnetic field leakage from the external magnet;
wherein each said torsion compensation coil is substantially circularly shaped,
wherein the primary coil comprises a rear leg and an opposing front leg connected by two side legs, the rear leg and the front leg each including facing inner surfaces; and, wherein each said torsion compensation coil is connected to the primary coil at the inner surface thereof where the rear leg connects to the respective side legs.

15. A method of making a voice coil motor capable of reducing torsion and/or bending forces introduced into an actuator fan tail portion of the voice coil motor, the method comprising:
    providing a primary coil and at least one torsion compensation coil;
    winding the primary coil;
    winding the at least one torsion compensation coil during the primary coil winding step;
    connecting the at least one torsion compensation coil to the primary coil; and,
    positioning a single external magnet under the connected at least one torsion compensation and primary coils,
    wherein the primary coil is capable of receiving a first current and the at least one torsion compensation coil is capable of receiving a second current,
    wherein the at least one torsion compensation coil is configured to reduce torsion and/or bending forces introduced by the first current passing through primary coil and/or magnetic field leakage from the external magnet;
    wherein the at least one torsion compensation coil is looped so as to form a gap between upper and lower portions of the torsion compensation coil;
    wherein the primary coil comprises a rear leg and an opposing front leg connected by two side legs, the rear leg and the front leg each including facing inner surfaces; and,
    wherein the at least one torsion compensation coil is connected to the primary coil at the inner surface of the rear leg of the primary coil.

16. The method of claim 15, wherein the connecting step is further practiced by folding the at least one torsion compensation coil over the primary coil.

17. The method of claim 15, wherein the connecting step is further practiced by bonding the at least one torsion compensation coil to the primary coil.

18. The method of claim 15, further comprising providing a circuit for providing a first current to the at least one torsion compensation coil and a second current to the primary coil.

19. The method of claim 18, wherein the circuit is either a parallel circuit or a series circuit.

20. The method of claim 18, wherein the first and second currents are provided so as to flow through their respective coils in opposite directions.

21. The method of claim 15, further comprising providing a single current source to apply the first current and the second current.

* * * * *